United States Patent
A G et al.

(10) Patent No.: US 10,974,728 B2
(45) Date of Patent: Apr. 13, 2021

(54) METHODS AND SYSTEMS FOR FACILITATING DRIVE RELATED DATA FOR DRIVER MONITORING

(71) Applicant: LightMetrics Technologies Pvt. Ltd., Bangalore (IN)

(72) Inventors: Krishna A G, Bangalore (IN); Pushkar Patwardhan, Bangalore (IN); Gururaj Putraya, Bangalore (IN); Ravi Shenoy, Bangalore (IN); Soumik Ukil, Bangalore (IN); Mithun Uliyar, Bangalore (IN)

(73) Assignee: LIGHTMETRICS TECHNOLOGIES PVT. LTD., Karnataka (IN)

( * ) Notice: Subject to any disclaimer, the term of this patent is extended or adjusted under 35 U.S.C. 154(b) by 0 days.

(21) Appl. No.: 16/566,841

(22) Filed: Sep. 10, 2019

(65) Prior Publication Data
US 2020/0079387 A1    Mar. 12, 2020

(51) Int. Cl.
| | |
|---|---|
| *B60W 40/09* | (2012.01) |
| *G06K 9/00* | (2006.01) |
| *G07C 5/00* | (2006.01) |
| *G06T 7/80* | (2017.01) |
| *G07C 5/08* | (2006.01) |

(52) U.S. Cl.
CPC ......... *B60W 40/09* (2013.01); *G06K 9/00845* (2013.01); *G06T 7/80* (2017.01); *G07C 5/008* (2013.01); *G07C 5/0816* (2013.01); *B60W 2540/30* (2013.01)

(58) Field of Classification Search
CPC ..... B60W 40/09; B60W 2540/30; G06T 7/80; G06K 9/00845; G07C 5/008; G07C 5/0816
USPC ....................................................... 340/439
See application file for complete search history.

(56) References Cited

U.S. PATENT DOCUMENTS

| | | | |
|---|---|---|---|
| 7,389,178 B2 | 6/2008 | Raz et al. | |
| 8,805,639 B1* | 8/2014 | Musicant | G07C 5/08 702/127 |
| 9,201,842 B2 | 12/2015 | Plante | |
| 9,298,575 B2* | 3/2016 | Tamari | G08G 1/0141 |
| 2008/0319604 A1* | 12/2008 | Follmer | G07C 5/0891 701/33.4 |

(Continued)

*Primary Examiner* — Omar Casillashernandez
(74) *Attorney, Agent, or Firm* — Kanika Radhakrishnan; Evergreen Valley Law Group

(57) ABSTRACT

Methods and systems for facilitating driver behavior monitoring and evaluation of driver performance during a trip are provided. The method includes facilitating, by a processing system of an on-board detection device positioned in a vehicle, recording of media data using cameras mounted on the vehicle and multisensory data using sensors positioned in the vehicle. The media data includes a plurality of image frames. The method includes generating metadata based on at least one image frame of the plurality of image frames and the multisensory data, detecting an occurrence of an event based at least on the metadata and a set of configuration parameters, uploading the metadata and the media data of the event to a cloud server based on event upload rules, and facilitating a media status update flag corresponding to the event, the media status update flag representing a completion of uploading of the media data of the event.

7 Claims, 12 Drawing Sheets

(56) References Cited

U.S. PATENT DOCUMENTS

2016/0099026 A1* 4/2016 Iguchi ................. G11B 27/102
                                                    386/241
2016/0117928 A1* 4/2016 Hodges ............... G08G 1/0967
                                                     701/99
2018/0075380 A1* 3/2018 Perl ....................... G06Q 50/30

* cited by examiner

| S NO | EVENT NAME | EVENT DATE | EVENT TIME | EVENT LOCATION | EVENT MEDIA | CHALLENGE TAB | DRIVER XYZ |
|---|---|---|---|---|---|---|---|
| 1 | LANE DRIFT | 05 AUG 18 | 2:30 PM | GOLDEN GATE | WWW.XYZ.COM/MEDIA_FILE.ABC | ☑ | |
| 2 | SPEEDING | 05 AUG 18 | 4:10 PM | ALCATRAZ ISLAND | WWW.PQR.COM/MEDIA_FILE.DEF | ☐ | |
| 3 | HARD BRAKING | 05 AUG 18 | 6:00 PM | OAKLAND BAY BRIDGE | WWW.MNO.COM/MEDIA_FILE.KLM | ☐ | |

FIG. 5

| LIST OF ABNORMAL TRIPS 902 : |||| 
|---|---|---|---|
| SYSTEM ID 904 | TRIP DATE 906 | TYPE OF VEHICLE 908 | REMARK 910 |
| 1235 | 05 AUG 19 | LCV | CAMERAS OFF |
| 6123 | 06 AUG 19 | MCV | SERVER DOWN |
| 7542 | 06 AUG 19 | HCV | CAMERAS NOT MOUNTED PROPERLY |

900

METHODS AND SYSTEMS FOR FACILITATING DRIVE RELATED DATA FOR DRIVER MONITORING

TECHNICAL FIELD

The present disclosure generally relates to a driver monitoring system and, more particularly to a method and a system for monitoring the driver's performance by computing a performance score corresponding to detected events and a user defined weight coefficient for each of the detected events.

BACKGROUND

Running a successful fleet consists of more than just engaging a driver to a vehicle and hoping for the best. One of the most important areas that can make or break a business whose operations depend on a fleet is the performance of all the drivers that come under the fleet. Understanding how a vehicle is driven by the driver behind the wheel becomes important, as risky driving performances contribute to 90% of the vehicle collisions, which inherently is a loss of money, loss of reputation, loss of time, etc., to the fleet.

Conventionally, the driver performance is determined by a computational system (hereinafter referred to as system), based on a multisensory data received from the vehicle. The multisensory data received from the vehicle may relate to a speed data, a braking data, undulation data experienced by the vehicle during acceleration and deceleration, a distance data and the like. Based on the data received, the system computes the driver performance by determining violation or infractions in each parameter set by a fleet manager, and the violation of the parameter may be stored and uploaded to the system as occurrence of an event. For example, if the speed data received indicates 75 kmph and a user defined parameter is 60 kmph, the over-speeding would be saved and uploaded to the system as occurrence of the event. The system inherently helps to promote safe driving conditions for the driver as well as passengers, through real time notifications and interventions upon occurrence of the event. The system also helps in making driving safer through timely driver coaching using analytics provided to both the driver and the fleet manager.

However, one of the limitations involved in the aforementioned system is the volume of event data that needs to be uploaded to the system, due to the number of events occurring in the vehicle during a trip. Also, as volume of the event data is typically large, the upload of the event data to the system becomes time consuming. Additionally, as the data bandwidth of the fleets is limited or finite, upload of irrelevant data becomes a costly process, and is thus undesirable. Moreover, the conventional systems utilize methods such as but not limited to computer vision, machine learning, artificial intelligence and the like, for determining events. However, these systems may not be accurate due to involvement of machine learning and hence, indication of false events may occur which is undesirable.

In view of the above, there is a need for an improved method and a system for monitoring the driver performance, which overcomes one or more limitations stated above.

SUMMARY

Various embodiments of the present disclosure provide systems and methods for facilitating drive related data for driver monitoring.

In one embodiment, a method for driver behavior monitoring in a vehicle during a trip is performed at an on-board detection device positioned in the vehicle. The method includes facilitating, recording of media data using a plurality of cameras mounted on the vehicle and multisensory data using a plurality of sensors positioned in the vehicle during a trip. The media data includes a plurality of image frames. The method includes generating metadata based on at least one image frame of the plurality of image frames and the multisensory data. The method includes detecting an occurrence of an event based at least on the metadata and a set of configuration parameters received from a fleet manager. Further, upon detection of the event, the method includes uploading the metadata and the media data associated with the event to a cloud server based on event upload rules. The method further includes facilitating a media status update flag corresponding to the event, the media status update flag representing a completion of uploading of the media data associated with the event.

In another embodiment, a method for evaluating driver behavior associated with a vehicle during a trip is performed at a cloud server. The method includes receiving metadata, from an on-board detection device positioned in the vehicle, associated with a detected event. The metadata represents an occurrence of the event associated with the vehicle during the trip. The metadata are generated from data recorded by a plurality of cameras and a plurality of sensors positioned in the vehicle. The method includes receiving, from the on-board detection device, media data associated with the detected event upon reception of the metadata. The complete reception of the media data is indicated by a media status update flag. Further, the method includes verifying the detected event based at least on the received metadata and media data and evaluating a driver performance based on the verifying step.

In yet another embodiment, a system for driver behavior monitoring in a vehicle during a trip is described. The system includes an interface, a transceiver, and a dashboard display. The interface is configured to receive vehicle data recorded by a plurality of cameras mounted on the vehicle and a plurality of sensors positioned in the vehicle. The system includes a transceiver that is configured to effect communication with a cloud server and a fleet manager device via one or more networks. The system also includes a memory configured to store instructions and a processor. The processor is configured to execute the instructions stored in the memory and cause the system to facilitate recording of media data using the plurality of cameras and multisensory data using the plurality of sensors positioned in the vehicle. The media data comprises a plurality of image frames. The processor is configured to cause the system to generate metadata based on the multisensory data and at least one image frame of the plurality of image frames, detect an occurrence of an event based at least on the metadata and a set of configuration parameters received from a fleet manager, and upload the metadata and the media data associated with the event to a cloud server based on event upload rules. The processor is further configured to cause the system to facilitate a media status update flag corresponding to the event, the media status update flag representing a completion of uploading of the media data of the event.

In yet another embodiment, a system for evaluating driver behavior associated with a vehicle during a trip is described. The system includes an interface that is configured to communicate with an on-board detection device positioned in the vehicle and a fleet manager device via one or more networks. The system also includes a memory configured to store instructions and a processor. The processor is configured to execute the instructions stored in the memory and cause the system to receive metadata associated with a detected event, from the on-board detection device. The metadata represents an occurrence of the event associated with the vehicle during the trip. The metadata are generated by the on-board detection device from data recorded by a plurality of cameras and a plurality of sensors positioned in the vehicle. The processor is configured to receive media data associated with the detected event upon reception of the metadata, where complete reception of the media data is indicated by a media status update flag. The processor is further configured to verify the detected event based at least on the received metadata and media data, update event data, the event data including information of a number of events detected during the trip, based on the verification of each detected event, and evaluate a driver performance based on the updated event data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

For understanding of exemplary embodiments of the present disclosure, reference is now made to the following descriptions taken in connection with the accompanying figures in which:

FIG. 5 illustrates a representation of a UI of a dashboard for displaying a list of events occurred during the trip, in accordance with an exemplary embodiment of the present disclosure;

Figure 1:
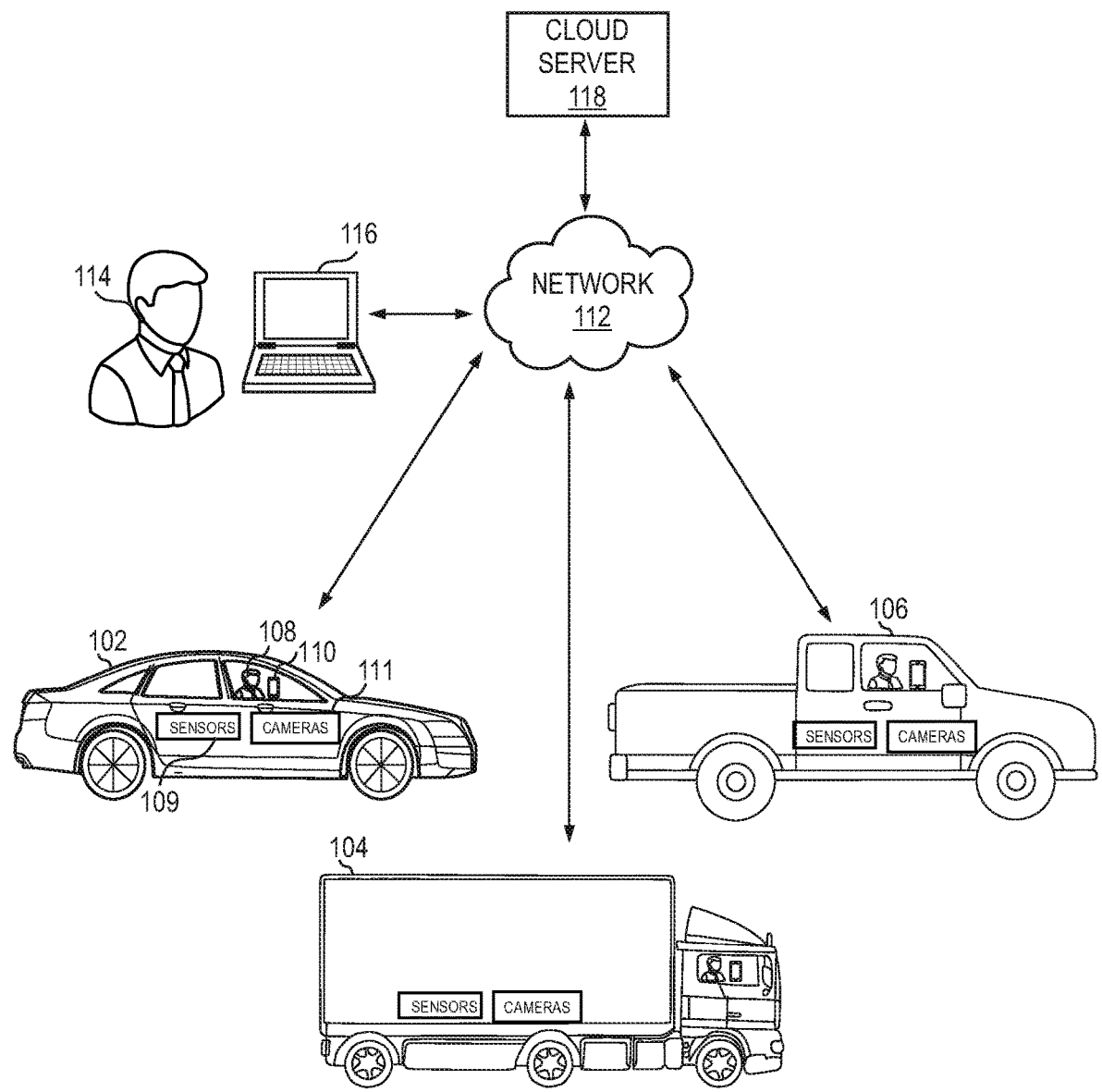
FIG. 1 illustrates an environment for facilitating drive related data to a cloud server for drive related analytics, in accordance with various embodiments of the present disclosure.

The Figures referred to in this description depict embodiments of the disclosure for the purposes of illustration only. One skilled in the art will readily recognize from the following description that alternative embodiments of the systems and methods illustrated herein may be employed without departing from the principles of the disclosure described herein.

DETAILED DESCRIPTION

Various computer implemented methods and systems for facilitating drive related data to a cloud server and determining a driver performance are disclosed.

In the following description, for purposes of explanation, numerous specific details are set forth in order to provide a broad understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide methods and systems for facilitating drive related data to a cloud server for drive related analytics. More specifically, embodiments disclosed herein refer to systems and methods for detecting events during a trip of a driver in a vehicle and facilitating uploading of event data associated with the detected event to the cloud server based on event upload rules defined by a fleet manager or the driver.

In various example embodiments, the present disclosure describes a system for driver behavior monitoring that is installed in the vehicle. The system includes an on-board detection device, a plurality of cameras mounted on the vehicle and a plurality of sensors mounted on the vehicle. The on-board detection device is connected to the plurality of sensors and the plurality of cameras through an interface. The on-board detection device is configured to facilitate recording of media data (i.e. video data) using the plurality of cameras and multisensory data using the plurality of sensors during the trip. The media data includes a plurality of image frames of vehicle environment. The on-board detection device is configured to generate metadata based on at least one image frame of the media data and the multisensory data. The at least one image frame may have information of an occurrence of an event. In at least one example, the event may include, but is not limited to, a speeding violation, a stopping violation, a traffic signal violation, lane drifting, tail gating, harsh braking, and harsh acceleration. The on-board detection device is further configured to detect an occurrence of the event based on the metadata and a set of configuration parameters. Thereafter, the on-board detection device is configured to upload the metadata and the media data associated with the detected event to the cloud server. The set of configuration parameters are defined by the fleet manager or a group of experts or drivers themselves based on their standards and risks. The set of configuration parameters refer to a plurality of event types, and threshold values for each of the plurality of event types.

During the trip or the drive, event data can be sent to the cloud server in real-time or near real time. The fleet manager can view all uploaded data simultaneously by accessing a database in the cloud server. For example, when a driver jumps a red light, the fleet manager may want immediate access to the same so that he/she can check with the driver and talk to them about driving more defensively.

If the event occurs, then the metadata and the media data need to be uploaded to the cloud server. Due to less size of metadata, the metadata is uploaded in real time. As a result, at the cloud server, it is known that the event has happened, and a media link can get created. However, it may take some time for the media data to upload to the cloud server. Therefore, in the present disclosure, a media status update flag is used for indicating availability of the media data on the cloud server. This ensures that the fleet manager does not face broken links, etc. When the media status update flag is set, the cloud server knows that the media data associated with the metadata is available or uploaded to the cloud server and can be used by the fleet manager.

Since cellular data is expensive, a fleet or a group of vehicles operating under the fleet manager wants to control the data that is to be uploaded on the cloud server. Uploading of data related to all the events is time consuming and it uses a lot of cellular data. In order to work within an allotted data budget per month, the various embodiments of the present disclosure provide a data upload framework by defining a hierarchy of importance for events and severity for violations and using the same in deciding what data/events to upload and when. The fleet may define event upload rules for ensuring an effective consumption of cellular data. For example, the event upload rules may be priority values associated with a plurality of events, a maximum number of events to be uploaded for every hour or a maximum number of events to be uploaded for every 25 miles. In an example, when the fleet chooses 2 events to be uploaded in an hour, the on-board detection device is configured to send the metadata and the media data related to only two detected events in an hour.

In one embodiment, the cloud server may be connected to a plurality of on-board detection devices mounted on a plurality of vehicles. The plurality of on-board detection devices is configured to upload metadata and media data associated with detected events to the cloud server. A media status update flag associated with the detected event indicates complete reception of the media data associated with the metadata at the cloud server. Thereafter, the cloud server verifies the detected event based on the received metadata and the media data of the detected event. At the vehicle side, it is not convenient to use complex algorithms for event detection, as a result, there is a high probability of false event detection at the on-board detection device. To overcome this problem, the cloud server verifies detection of the detected event by utilizing computationally complex event detection and sophisticated algorithms for reliable detection. More specifically, the cloud server may utilize computer vision, machine learning and artificial intelligence techniques for detecting objects/events of interest and ensures compliance. The cloud server then updates event data corresponding to the driver during the trip based on the verification.

The cloud server evaluates a driver performance based on the updated event data and the received metadata and media data associated with the detected event and calculates a performance score associated with the driver during the trip. The calculation of the performance score is based at least on a number of detected events during the trip, a distance travelled during the trip, and weighting coefficients associated with the detected events. The weighting coefficients are defined by the fleet manager for each event and are stored in the cloud server before starting of the trip.

In some scenarios, it may happen that the event detection using the machine learning algorithms is flawed and evaluated driver analytics is misleading. Therefore, there is a need to preclude such falsely detected events in a convincing manner while driver behavior evaluation processes. In one embodiment, the driver and the fleet manager can view data dashboard related to the detected events during the trip. The data dashboard can be implemented using APIs stored within the cloud server. The driver or the fleet manager can view a tabular dashboard consisting of detected events with date and time, a link to media file such as image/video, and a challenge button corresponding to each detected event. In one embodiment, when the driver feels that a particular event was wrongly called, he/she can press challenge button corresponding to the particular event. For example, a speed sign was misread, which leads to a speed violation event being called, then the "challenge" feature allows the driver and/or the fleet manager to disagree with the detection. When the driver presses a challenge button associated with the speed violation event on the dashboard display of the on-board detection device, a notification is sent to the fleet manager. The fleet manager can manually review the event by analyzing the metadata and the media data associated with speed violation event. Based on the review, the fleet manager sends a notification to the cloud server for updating the performance score associated with the driver during the trip. Thereafter, the cloud server updates the performance score of the driver based on the received notification. In some embodiments the fleet manager himself/herself can challenge an event which will be flagged for review by a tech support provider or a call center.

Various embodiments of the present disclosure are described with reference to FIGS. 1-12 of the present disclosure.

FIG. 1 illustrates in one exemplary embodiment of the present disclosure, an environment 100 for facilitating drive related data to a cloud server for drive related analytics. The environment 100 includes a wireless communication network (e.g., a network 112) that associates with entities such as, a plurality of vehicles (102, 104, 106), a fleet manager 114, and a cloud server 118. In an example, the driver 108 drives a vehicle 102, such as but not limited to, a Light Commercial Vehicle (LCV), a Heavy Commercial Vehicle (HCV), a Medium Commercial Vehicle (MCV) or any other vehicle, under a fleet of the fleet manager 114. The present disclosure hereinafter is explained by taking an example of the vehicle 102, however, the present disclosure can be applied to other types of vehicles as well.

The vehicle 102 may be equipped with a plurality of sensors 109 (hereinafter referred to as the sensors 109), a plurality of cameras 111 (hereinafter referred to as the cameras 111), and an on-board detection device 110 to capture and process vehicle data.

The sensors 109 and the cameras 111 may be associated to various parts of the vehicle 102 for capturing of data pertaining to the vehicle 102. The vehicle data may include an audio data/a visual data i.e. the data recorded from the cameras 111 pertaining to the vehicle 102, and multisensory data i.e. the data recorded from the sensors 109 pertaining to the vehicle 102. The media data and the multisensory data may include information about events that might have occurred when the driver 108 is operating the vehicle 102. The events that may occur while operating the vehicle 102 may include traffic speed violation, cornering, harsh braking, sudden acceleration, harsh acceleration, tail gating, lane drifting, traffic signal violation and the like.

In an embodiment, the sensors 109 may include, but are not limited to, GNSS sensors (such as global positioning system (GPS), global navigation satellite systems (GLONASS), Galileo, etc.), inertial sensors (i.e., gyroscopes, accelerometers, etc.), wheel speed sensors, a yaw rate sensor, differential speed sensors, radar sensors, outside temperature sensors, laser sensors, camera sensors, and/or any other appropriate sensors. The sensors may provide information related to the vehicle, such as speed, odometer readings, revolutions per minute (RPMs), pedal position (e.g., gas, brake, clutch, etc.), turn signal indications, fuel level, battery charge level, gear position, etc. The sensors may be able to communicate with the on-board detection device 110 in various appropriate ways (e.g., using a serial bus such as a controller area network (CAN) bus, using wireless communication links, etc.).

In an embodiment, the cameras 111 may include, but are not limited to, a dashboard camera, a smartphone camera, an advance driver assistance system (ADAS) camera, a blind spot camera, a set of cameras mounted on different locations in the vehicle to cover 360-degree environment and the like.

The on-board detection device 110 is configured to monitor occurrences of a variety of events by monitoring the media data and the multisensory data. The on-board detection device includes a dashboard display, which may be conveniently mounted for observation and manipulation by the driver such as near the vehicle dash. The dashboard display may be, such as but not limited to, a cathode ray tube (CRT), a Liquid Cathode Diode (LCD) screen, a touch screen and a laptop screen for displaying information of detected events. The dashboard display preferably has an operator interface such as a keypad, keyboard, touch screen, display screen or any suitable user input device and may further include audio input capability such as a microphone to allow voice communications.

In at least one implementation, the on-board detection device also includes a processing system that may be embedded or implemented in an electronic device, for example, a mobile phone, a smart telephone, a computer, a laptop, a PDA (Personal Digital Assistant), a Mobile Internet Device (MID), a tablet computer, an Ultra-Mobile personal computer (UMPC), a personal navigation device or a portable navigation device (PND), or a handheld personal computer. The processing system may include one or more processors.

In an embodiment, when the driver 108 is driving the vehicle 102, the processing system facilitates recording the drive related data. The sensors 109 are configured to record multisensory data and the cameras 111 are configured to capture the media data. The processing system present in the on-board detection device 110 is capable of generating metadata related to the recorded data. The metadata may include, but is not limited to, location of the event, a time of the event, a date of the event, a 3D map of the location of the event, at least one image frame from the media data and the like. The processing system determines an occurrence of event based on the generated metadata at that time.

The fleet manager device 116 may be capable of being connected to the plurality of vehicles (102, 104, 106) and the cloud server 118 through the wireless communication network (such as the network 112). The fleet manager 114 or a group of experts defines and sends a set of configuration parameters to each vehicle. The set of configuration parameters is different for different vehicles such as but not limited to LCV, MCV, and HCV and includes threshold parameters for detecting occurrence of each event based on a type of vehicle. The set of configuration parameters varies for each type of vehicle. For example, for a following distance, a heavy vehicle needs more braking distance compared to a light vehicle, and as a result, for an HCV, the following distance has to be set at more sensitive levels than for a light vehicle. Similarly, for speeding, different speed limits are applicable depending on the type of the vehicle.

The processing system is configured to upload the metadata and the media data associated with the detected event to the cloud server 118 based on event upload rules. The event upload rules correspond to parameters that define what to be upload, when to upload and how much to upload. These event upload rules are facilitated in order to reduce the consumption of cellular data and may be set by a fleet or the fleet manager 114 at a start of a trip. The processing system of the on-board detection device 110 also facilitates a media status update flag along with the metadata for indicating complete uploading of the media data to the cloud server 118.

In at least one implementation, the fleet manager device 116 may include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

The on-board detection device 110 is adapted to monitor driver performance and may be in continuous communication with the cloud server 118. The metadata and the media data associated with the detected event may either be locally analyzed by the processing system of the on-board detection device 110 or may be transmitted to the cloud server 118 via the network 112. In an exemplary embodiment, the network 112 may include stand alone or a combination of a local area network (LAN), a wide area network (WAN), a wireless network, a wired network, a vehicle to vehicle communication network or any currently existing or to be developed network that can be used for communication purposes. More specifically, an example of the network 112 can be the Internet which may be a combination of a plurality of networks.

The cloud server 118 may be a local server or may be a physical server positioned in a geographical location at a remote location from the vehicle for processing the metadata and the media data. The data related to events can be provided as an online service, or as an application. Typical users of such an application or service include entities having a fleet of drivers or vehicles and consumers using the data related to events for the purpose of letting their insurers know the risk that their driving entails.

In at least one embodiment, the cloud server 118 may process the metadata either completely or partially (other part being already processed locally) with media data to determine a context as a cause of an event. The cloud server 118 may also provide access to the metadata associated with the event to the fleet manager 114 via the network 112. The media status update flag indicates complete reception of the media data associated with the metadata at the cloud server 118 and the media data can be accessed by the fleet manager afterwards. The cloud server may verify or auto-review an event detection of the detected event based on the received metadata and the media data of the detected event. The cloud server 118 may utilize complex computational algorithms for verification to obtain reliable detection of events. The cloud server 118 may update event data associated with the vehicle during the trip and calculate a performance score of the driver based on a number of detected events and a predetermined weight coefficient associated with the number of detected events.

In an embodiment, weight coefficients of events may be values assigned by the fleet manager 114 for each of the events occurring during the vehicle 102 operation. The fleet manager 114 assigns the weight coefficients corresponding to a risk profile of the all vehicles under his/her management and as per the goals of the fleet in terms of making the fleet safer, etc. For e.g. if speeding events are a concern for the fleet, a higher weight can be assigned for speeding. In another embodiment, the fleet manager 114 assigns weight coefficients corresponding to the metadata received for each of the driver 108. The weight coefficients may be stored for each of the driver 108 working in the fleet in the cloud server 118. In an embodiment, the weight coefficients may be an integer value ranging between 0-9. The weight coefficients for each of the driver may be particularly useful in scenarios where parents want to monitor a teenage driver, or an auto insurance company wants to monitor individual drivers, etc.

In an embodiment, the performance score of the driver 108 may be determined by Eqn. (1) mentioned below.

$$R = \left(1.0 - \frac{\sum_{n=1}^{7} W_i * \text{Min}\left(\left(\frac{100 * E_i}{D}\right), 100\right)}{\sum_{n=1}^{7} 100.0 * W_i}\right) * 100 \quad \text{Eqn. (1)}$$

Wherein:
R is the rating of the driver 108;
$E_i$ is the number of events;
'i' is one of the event types mentioned in the event data;
D is the distance covered by the vehicle 102 in miles for the trip;
$100.0 * E_i/D$ is the number of events per 100 miles;
Wi be the weight coefficient assigned to 'i'th type of event.

It is to be noted that the events per 100 miles statistic may be used as it is, instead of inverting it (i.e. subtracting it from 1) and converting it to a rating or score.

In an embodiment, to ensure that the performance score of the driver 108 is between 0 to 100, $(E_i/D)*100$ is capped to 100.0. It is to be noted that the Eqn. (1) can be applied to a trip, or to a duration selected across trips, days, weeks and more.

For an example, when the driver 108 is driving an LCV during a trip and the threshold for the speed violation event is 80 Kmph and the driver 108 exceeds the threshold i.e. 80 Kmph, then the processing system of the on-board detection device 110 detects an event of speed violation for the driver 108 and may upload the metadata and media data related to that event to the cloud server 118 accessible by both the driver 108 and the fleet manager 114. The metadata related to speed violation event may include the maximum speed, the time of occurrence, the date of occurrence, at least one image frame from the media data, G-sensor trace for that instant etc. The media data may comprise video footage of occurrence of the speed violation event and footage of four to five seconds around the event occurrence time. The cloud server 118 then verifies the detection of the detected event using complex and sophisticated algorithms and updates the metadata associated with the event based on the verification. Thereafter, the cloud server evaluates a driver performance by calculating the performance score using the formula (as mentioned in Eqn. 1).

Figure 2:
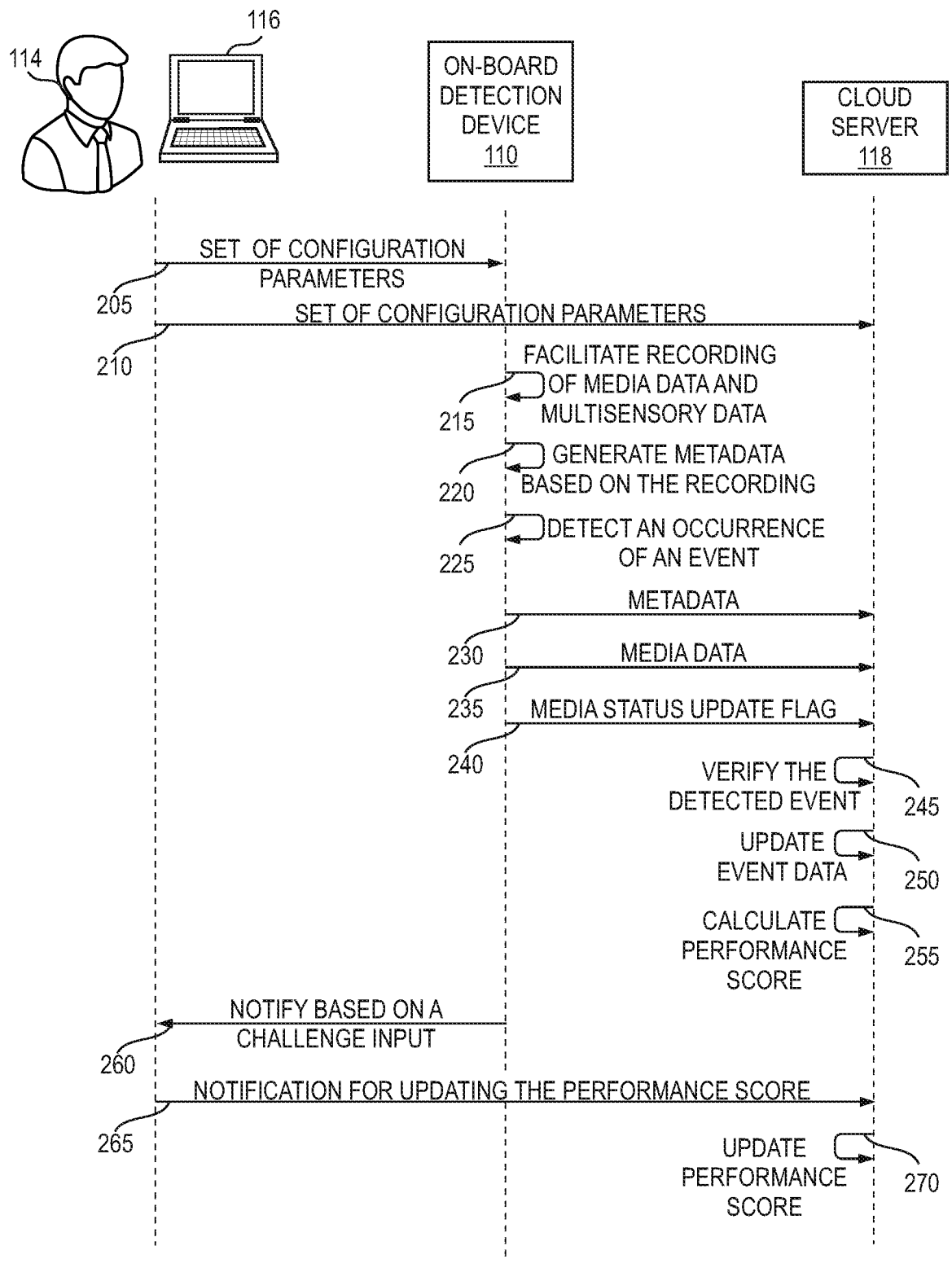
FIG. 2 is a sequence flow diagram for determining a driver performance in accordance with the embodiments.

FIG. 2 represents a sequence flow diagram 200 for facilitating evaluating a driver performance associated with a vehicle during a trip, in accordance with an example embodiment. The sequence of operations of the flow diagram 200 may not be necessarily executed in the same order as they are presented. Further, one or more operations may be grouped together and performed in form of a single step, or one operation may have several sub-steps that may be performed in parallel or in sequential manner. The flow diagram is explained by taking an example of the vehicle 102, however, the flow diagram can be applied to other types of vehicles as well.

At 205, the fleet manager 114 defines a set of configuration parameters and sends it to an on-board detection device 110 at a start of the trip. The set of configuration parameters is different for different vehicles such as but not limited to LCV, MCV, and HCV and includes threshold parameters for detecting occurrence of each event based on a type of vehicle. The set of configuration parameters are defined by a fleet manager and sent to the on-board detection device 110. Based on these configuration parameters, the on-board detection device is configured to detect occurrences of events.

Similarly, at 210, the same configuration parameters are also sent to the cloud server 118. The cloud server 118 is used to verify the detected events using more sophisticated algorithms in order to auto-review the detected events. In one embodiment, at the start of every trip, and during every trip at certain intervals, the fleet manager device polls configuration settings on the cloud server to ensure that the correct compliance numbers and metrics are enforced At 215, on-board detection device 110 facilitates recording of media data and multisensory data during a trip of a vehicle. A plurality of cameras mounted on the vehicle are used to record the media data which comprises of audio and visual data of a driving scene and a plurality of sensors positioned in the vehicle are used to record multisensory data such as, but not limited to, the speed, the acceleration force, location, the deceleration force etc. The media data may comprise a plurality of image frames and the sensory data may comprise of values recorded by the sensors and some graphs and traces.

At 220, the on-board detection device 110 is configured to generate the metadata based on the recorded media data and metadata. The metadata may include at least one image from the plurality of image frames present in the media data and values extracted from the multisensory data. The metadata is utilized to detect an occurrence of an event. Along with the generated metadata by the processing system, the set of configuration parameters received from the fleet manager device is also utilized in the detection of the occurrence of events.

At 225, the on-board detection device 110 is configured to detect an event occurrence based on the generated metadata and the set of configuration parameters received from the fleet manager device. For example, if the threshold for a speed violation in the set of configuration parameters is 70 Kmph and the driver has crossed the limit and has driven the vehicle in 80 Kmph, the on-board detection device 110 detects an event of speed violation based on the generated metadata in real time.

At 230, the on-board detection device 110 is configured to send the metadata related to the detected event to a cloud server 118. In one embodiment, the metadata may comprise data such as the time and date of occurrence of the event, location of occurrence, an image frame from the plurality of image frames. In some embodiments, the image frame received in the metadata may depict most important image for determining the event occurrence.

At 235, the on-board detection device is configured to upload the media data associated with the detected event to the cloud server. The metadata is almost sent in the real time by the on-board detection device but the media data due to its file size takes a bit longer to be delivered and hence a media status update flag is rendered by the on-board detection device to indicate availability of the media data at the cloud server.

At 240, the on-board detection device sets the media status update flag after the media data associated with the detected event is completely uploaded to the cloud server is ready to be viewed. The media status update flag is a visual representation for the fleet manger to notify a successful completion on media data reception to the cloud server 118. In some embodiments, the fleet manager may be able to click on the detected event and view media data only after the media status update flag is set.

Further at 245, the cloud server 118 is configured to verify or auto-review all the events that were previously detected by the on-board detection device. The method of verifying all the detected events received by the on-board detection device is termed as 'Auto Review'. The verification of the detected events may be done after each trip and in some embodiments, the verification may be done on-demand based on a request received from a driver through on-board detection device.

At 250, the cloud server 118 is configured to update or modify the data related to the detected events based on the verification step 245. If the cloud server 118 finds out that an event detected by the on-board detection device is wrongly processed, then the cloud server updates event data related to that vehicle. The modification of the event data related to the event, is facilitated in order to provide a fair performance score for the driver. The event data may include information of all detected events associated with the vehicle during the trip.

At 255, the cloud server 118 is configured to calculate a performance score of the driver 108. The performance score of the driver 108 is calculated after each trip based on a number of detected events, weight coefficients corresponding to the number of detected events and a total distance travelled by the driver in the trip.

In some embodiments, the driver and the fleet manager can view event data in form of a data dashboard on their display. The cloud server is configured to store appropriate APIs for facilitating the data dashboard at the fleet manager and the driver. In the data dashboard, a challenge button corresponding to each of the detected events is provided. When the driver or the fleet manager feels that an event is falsely detected, they may select a challenge button for review.

At 260, when the driver 108 selects a challenge input by pressing the challenge button, the on-board detection device 110 is configured to send a notification to the fleet manager device 116. The fleet manger 114 can take further actions to review the event detection carefully and make the changes accordingly At 265, fleet manager device 116 sends a notification for updating the performance score to the cloud server 118. At 270, the cloud server 118 is configured to update the performance score of the driver based on the notification message. Thus, the embodiments disclosed above ensure an effective way of evaluating driver behavior of a driver in a vehicle by detecting events during a trip and calculating performance score of the driver.

Figure 3:
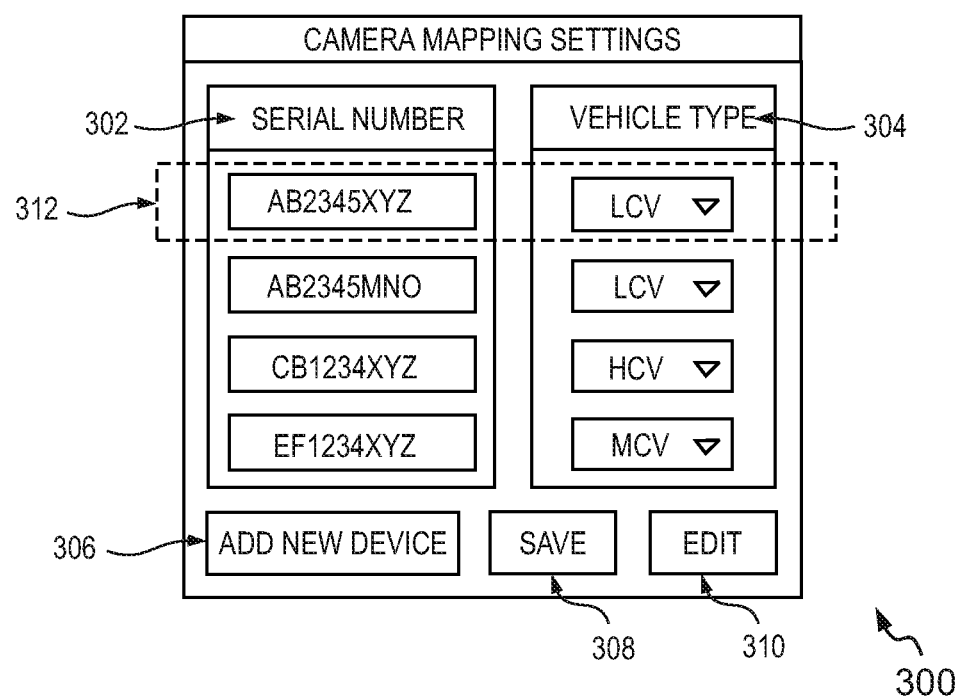
FIG. 3 illustrates a representation of a User Interface (UI) of a dashboard depicting mapping of a camera to a vehicle, in accordance with an exemplary embodiment of the present disclosure.

Referring now to FIG. 3, a User Interface 300 (hereinafter referred to as UI 300) to depict mapping of cameras (for e.g., the cameras 111) to vehicles (for e.g., the vehicle 102) is illustrated. It shall be noted that the user interface 300 is accessible to a technician or an installer working under a fleet for installing the cameras 111 and the sensors 109 in vehicles being operated by the fleet.

The UI 300 may include a tabular layout, for visualizing the mapping between the cameras 111 and the vehicle 102. The tabular layout may include a serial number field 302 and a vehicle type field 304. The column associated with the serial number field 302 lists a plurality of unique serial number associated with each of the cameras 111. The vehicle type field 304 provides a drop-down menu with options such as LCV, MCV, HCV etc. for defining the vehicle type to which a camera with a particular unique serial number is associated. For example, as seen in a row 312 of the UI 300, a camera with unique serial number "AB2335XYZ" is associated with the "LCV". In an embodiment, the vehicle type field 304 may also include the option of choosing a vehicle manufacturer, an engine number of the vehicle 102 and the like as per feasibility and requirement.

The UI 300 may also include an add new device icon 306, a save icon 308 and an edit icon 310. Clicking on the add new device icon 306 will enable the technician or the installer to add a new row in the table, in which the technician or the installer can add the details of a new camera and the vehicle type. Clicking on the save icon 308 will save data of the table on the cloud server 118. Clicking on the edit icon 310 will provide an option to the technician or the installer for editing information provided in UI 300.

This configuration of the UI 300 ensures that a particular camera is mapped only to a particular vehicle, thereby ensuring that the driver 102 may not tamper or replace the camera. In an embodiment, if the camera is replaced or misaligned or is tampered, the UI 300 is adapted to notify the fleet manager 114 suitably. Further, upon detection of tampering of the camera, the UI 300 may save the trip to be an abnormal trip within the dashboard display associated with the on-board detection device. The notification may be provided by means such as but not limiting to audio means, visual means or any other means which serves the purpose. Since, every time a person installs the cameras and the sensors in the vehicle, the person has to map the cameras and the sensors to the type of vehicle they are installed in. Therefore, it makes quite tedious or time-taking process for the person at every time to provide information of vehicle type in which the cameras with their serial numbers are installed.

Hence, to address these challenges and to provide other benefits, one embodiment of the present describes a method for automatically detecting a type of vehicle using installed cameras and sensors in the vehicle. In one embodiment, the processing system of the on-board detection device 110 itself may detect the type of vehicle using the cameras and other sensors present in the vehicle. In one example, the processing system may use data recorded by the cameras and G-sensors. A road view recorded by the camera gives an indication of the height of the vehicle (height of the camera). Further, the processing system may implement machine learning algorithms for detecting the type of vehicle using sensory data and media data. The machine learning approach may also be applied with features, such as, but not limited to, image/video data, G-sensor data etc., and labels, such as light/medium/heavy. A classifier or a neural network is configured to learn mapping of features and the labels during training. During inference, given the image/video and the G sensor data, the classifier or the neural network will predict a label i.e. type of vehicle. In an optional embodiment, the processing system may communicate the detected vehicle type to the cloud server and the fleet manager to provide type of vehicle information.

Figure 4:
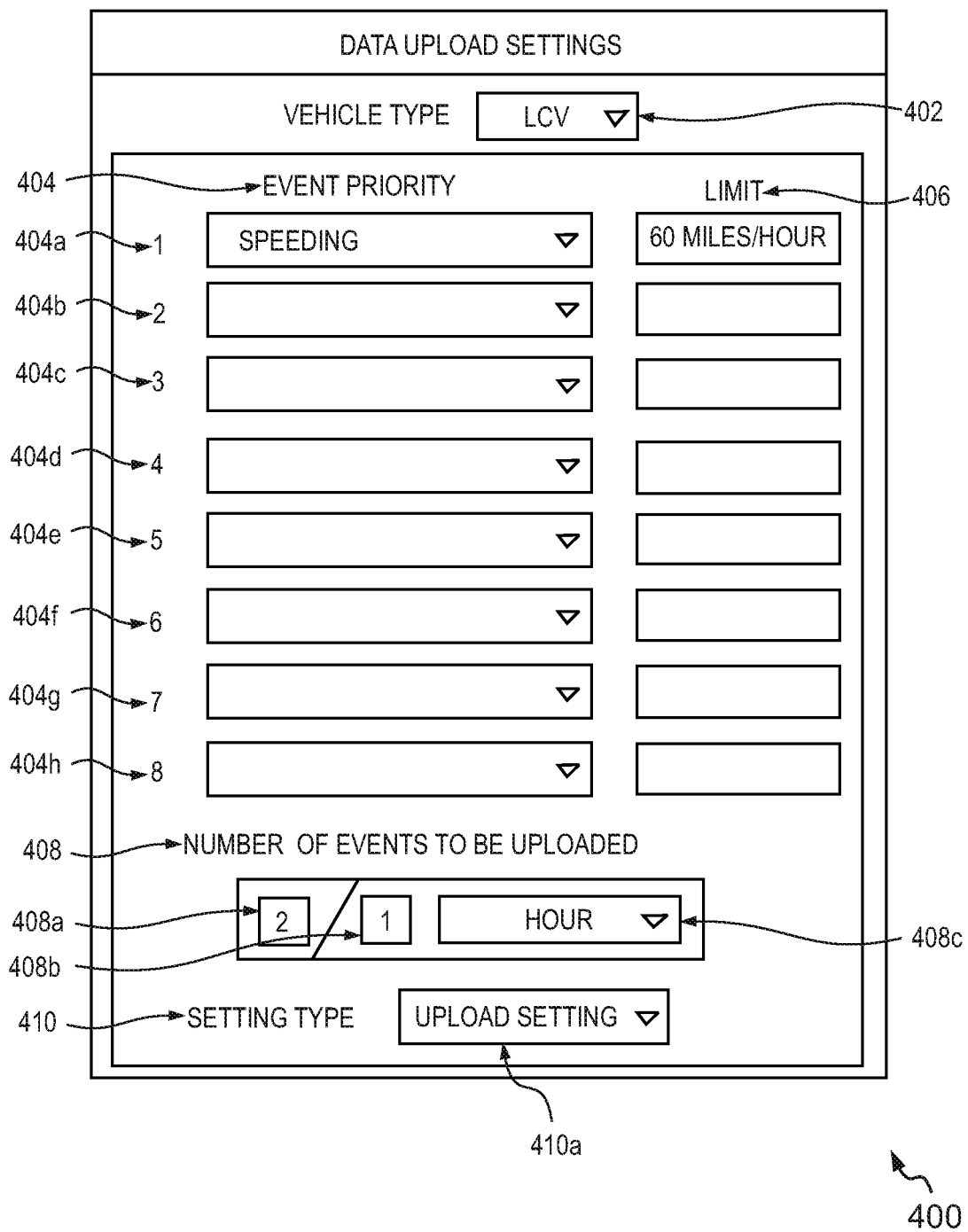
FIG. 4 illustrates a representation of a UI of a setting page accessible to the fleet manager and fleets, for setting a set of configuration parameters and event upload rules, in accordance with an exemplary embodiment of the present disclosure.

Referring now to FIG. 4, a User Interface (UI) 400 for setting the set of configuration parameters and event upload rules is illustrated. The UI 400 may be accessible to the fleet manager 114 and a fleet i.e. drivers of vehicles (see, 102, 104, and 106 shown in FIG. 1).

The set of configuration parameter includes information of a vehicle type and threshold parameters of one or more events for the type of vehicle. The set of configuration parameters is defined by the fleet manager 114. The setting page 400 includes an option 402 for selecting the 'Vehicle Type'. The option 402 may be a drop-down menu and may display built-in values such as but not limited to a light commercial vehicle (LCV), a medium commercial vehicle (MCV) and a heavy commercial vehicle (HCV) and the like. The setting page also includes a limit field 406 for each event priority field 404*a*-404*h*. The limit field 406 may be used by the fleet manager for setting threshold values corresponding to each event. The limit field 406 may be used to define severity of the event.

Since every fleet works with a finite data budget, no matter how large or small, there needs to be a way that governs amount of data being used for uploading metadata and media data about driving events that is used to build driver profiles on the cloud server 118. Therefore, a fleet or a group of vehicles defines the event upload rules for uploading metadata and media data to the cloud server 118.

In one embodiment, the event upload rules may be defined by the fleet manager. The setting page 400 may be accessible to the fleet manager 114 and the fleet, for setting priorities of events that can be encountered while the driver is driving the vehicle. The priorities of events are set based on a vehicle type and ensure that the event data is uploaded to the cloud server 118 corresponding to the set priority.

The setting page 400 includes, an event priority field 404 which may include, a list of priority fields 404*a* to 404*h* with a drop-down menu. The drop-down menu may display built-in values such as the harsh braking, the lane drifting, the speeding, the cornering, the sudden acceleration, the tail gating, etc. The priority fields 404*a* to 404*h* may be numbered from 1 through 8 in an ascending order of their priorities. The fleet manager can set priority for events occurring in a particular vehicle type by selecting events in the ascending order of priority in the list of priority boxes 404*a* to 404*h*. For example, if five types of events are detected while driving the vehicle 102 (the lane drift, the speeding, the stop violation, the tailgating distance and the hard braking), the fleet may set the order in which these events need be uploaded in the order of their priorities.

For an example, as illustrated in the FIG. 4, for the LCV vehicle type, the first priority is set for speeding event, whose limit is set to 60 miles/hour. When the vehicle 102 travels at a speed greater than 60 mph, then the processing system of the on-board detection device 110 detects it as an event (i.e. speeding violation) and uploads metadata and media data associated with the event to the cloud server 118 on prior basis. In another example, the limit field 406 may include the limit as miles per hour (mph) for violation of a traffic signal in case of signal braking, distance for tailgating and the like. In another example, the limit field may include limiting values of time to collision or distance in case of object collision events and speed of the vehicle in case of hard braking events.

The setting page 400 further includes a number of events fields 408, which may indicate the number of events to be uploaded on the cloud server 118, as per cellular data availability at the fleet. The number of events fields 408 includes fields 408*a*, 408*b* and 408*c*. The field 408*a* may be used the fleet or the fleet manager to define frequency of the events to be uploaded on the cloud server. The field 408*b* can be used to define numerical value associated with a frequency parameter. The field 408*c* is a drop-down menu displaying the frequency such as but not limited to miles, hours and the like. For example, if the fleet sets a value of "2" in the field 408*a*, "10" in the field 408*b* and selects miles in the field 408*c*, then the frequency of uploading event data would be 2 events/10 miles. In an embodiment, if there are more events than an allowed number of events, the events with higher priorities may be uploaded on the cloud server 118, or those with higher severity may be uploaded.

In some embodiments, a greedy method can be used to upload the metadata and media data related to the detected events. In this case, the priority values corresponding to the plurality of events do not matter. The processing is configured to upload metadata and media data, associated with events that are detected firstly, to the cloud server 118. In an alternative embodiment, if there are a greater number of detected events having the same priority, metadata and media data of any randomly chosen event may be uploaded to the cloud server 118.

In another embodiment, if there are more than allowed number of events, event data for the remaining events can be stored on a device of the driver for a specified duration of time (e.g., 24 hours), and can be optionally requested by the fleet manager 114 within that duration by sending a request to a management portal. In yet another embodiment, the metadata associated with the event may be uploaded in real time or near real time during the trip and the upload of media may be kept on hold till the end of the trip. Once the trip is completed, all the events that occurred in the trip can be reviewed to select the most importance events for upload. The logic for selecting important events can be configured based on the type of event and the severity of the event as set by the fleet manager 114. There can be another setting which involves modifying the media data parameters (such as resolution, bit rate, frames per second, etc.) until the quantum of media data upload meets the desired limit. A combination of the two may also be used to determine which media data to upload on the cloud server.

The setting page 400 also includes, a setting type field 410 including a field 410*a* with a drop-down menu which may display an 'upload setting' option and a 'save setting' option. The fleet or the fleet manager can define 'upload setting' option, to optimize size of the event data (media data) associated with the events, while uploading the event data on the server. The media data may be optimized through various trade-offs (For example, frames per second, bit rate, spatial resolution, type of codes etc.) common in video/images. The 'save setting' option can be selected when the fleet or the fleet manager 114 requires optimization of the media data, for quality rather than file size. The 'save setting' allows the fleet manager to access a higher quality video for reviewing a particular event in detail.

In some embodiments, some fields (for example, vehicle type) in the setting page 400 may be automatically complied by the processing system of the on-board detection device 110, upon interaction with the sensors 109 and the cameras 111 of the vehicle 102.

The values or instructions set by the fleet manager 114 on the setting page 400 may be stored on the cloud server 118 at regular time intervals to ensure that correct metrics are enforced while the vehicle 102 is driven by the driver 108.

In an example embodiment, the event data may be uploaded in real-time or as per a frequency set by the fleet. In another example embodiment, if event data is being uploaded every hour, then data upload logic for the previous hour can be used to determine the events to be uploaded in the current hour. For instance, if the speeding event and the cornering event are already uploaded in the previous hour, events occurring other than speeding event and the cornering event will be uploaded for the current hour. In yet another embodiment, the event data may be uploaded in real time or near real time during the trip. Once the trip is completed, all the event data can be reviewed to select the most importance events for upload. The logic for selecting important events can be configured based on a type of event and the severity of the event as set by the fleet manager 114.

Referring now to FIG. 5, a schematic representation of a user interface (UI) of a data dashboard 500 for displaying a list of events occurred during the trip, is illustrated. The data dashboard 500 is displayed on the dashboard display of the on-board detection device 110. The data dashboard 500 includes information related to the events that occurred while the driver was driving the vehicle 102. The data dashboard 500 can be viewed by the driver 108 as well as a fleet manager 114. In an embodiment, the data dashboard 500 displays metadata related to the detected events, as information during operation of the vehicle 102.

The data dashboard 500 includes an event name field 502, an event date field 504, an event time field 506, an event location field 508, a media field 510, a media status update flag 512 and a challenge tab 514. The event name field 502 indicates a name of the event occurred during operation of the vehicle 102. The event may be, but not limited to, harsh braking, sudden acceleration, lane drift and the like. The event can be detected by a system, such as the on-board detection device 110 or the cloud server 118. The event date field 504 indicates a date on which the event has occurred. The field 506 indicates the time at which the event has occurred. The field 508 represents an exact location where the event has occurred. In an embodiment, the event location may be represented by a location name (for example: golden gate, Alcatraz Island and the like). In another embodiment, the event location may be represented by location coordinates. In an exemplary embodiment, as illustrated in a row 516 of the FIG. 5, an event 'Lane drift' is detected on date '5 Aug. 2018' on '2:30 PM' at location 'Golden gate'.

Further, the media field 510 may include a link to the media data associated with the event. For example, as seen in the row 516 of the table, a link 'www.xyz.com/media_file.abc' is provided for the event 'Lane drift'. The driver 108 or the fleet manager 114 is able to access the media data associated with the event 'Lane drift' by clicking on the link. The media data can be a video data, or an image data captured upon occurrence of the event. The media data serves as a proof of the event and can also be used as an educational material for training the drivers. Additionally, a media status update flag 512 may be provided in the data dashboard 500, for representing the availability of the media file associated with each event that is listed in the data dashboard 500. The media status update flag 512 is provided to provide an indication to the fleet manager upon completion of the uploading process of the media data at the cloud server. In an exemplary embodiment, the media status update flag 512 may be located adjacent to the media field 510 (e.g. as shown in FIG. 5). In another embodiment, the media status update flag 512 functionality is enabled in the data dashboard 500 by appropriate web API's.

In an exemplary scenario, the driver has committed an infraction by violating a traffic signal. The cameras 110 associated with the vehicle 102, records an occurrence of the event and the same would be displayed on the data dashboard 500. The data dashboard 500 displays the metadata associated with the event while the media data associated with the event is being simultaneously uploaded in the background. Upon completion of the uploading process of the media data, the media status update flag may be highlighted, indicating to the fleet manager the availability of the media data. This configuration of the data dashboard 500 ensures that the fleet manager can access the media data as and when required, without interruptions that may occur during the uploading process such as buffering. In an embodiment, the data dashboard 500 may also present a thumbnail (not shown in Figure), after the completion of the uploading process. The thumbnail may be used to indicate a most severe moment of the event. For example, in the case of a tail gating event, the moment when the vehicle is closest to the vehicle in front is captured and shown in the thumbnail. Similarly, in case of a speeding event, the moment when the vehicle is going the fastest compared to a speed limit detected is captured and shown in the thumbnail. Further, for certain event videos, a picture in picture format is desirable for thumbnail. For example, in case of the speeding event, the speed sign image can be inlaid in a picture in picture format. In case of video event, a graphics interchange format (GIF) consisting of a key few seconds of the event may be used as a thumbnail in the data dashboard 500.

Furthermore, the data dashboard 500 includes a challenge tab 514 associated with each event listed in the data dashboard 500. The challenge tab 514 provides an opportunity to the driver and the fleet manager to disagree with assessment of the event. This configuration of the data dashboard 500 ensures that the errors that may occur during the analysis of the data by processor using machine learning methods is eliminated by providing an opportunity to the driver and the fleet manager for reviewing the event. For example, if the cloud server 118 or the on-board detection device 110 erroneously detected a speed sign during the operation of the vehicle, the driver or the fleet manager may review the event for a logical and accurate assessment of the event. In an embodiment, when the driver actuates the challenge tab 514 associated with the event, the event is put up for review with the fleet manager. The fleet manager can review the event and provide assessment. Further, a notification may be sent to the cloud server 118 and the scoring or driver rating is recomputed taking the change into effect. For e.g. if there was an over speeding wrongly called, and the challenge for the same is accepted, then the performance score or rating will be improved for the driver. Further, in some embodiments, in case of traffic sign compliance, such as speeding, acceptance of a challenge for any driver can automatically trigger a review for all other drivers in the recent past at the same location. In addition, the event data stored may be updated so that the same error does not repeat at the same location for any of the driver working in the fleet.

In another embodiment, when the fleet manager presses the challenge tab 514 associated with an event, the event is put up for review by a tech provider or a call center. The tech provider or the call center can review the event and provide assessment.

In at least one example embodiment, the events listed in the data dashboard 500 is reviewed or re-verified at the cloud server 118 by using computationally complex and sophisticated algorithms based on the event media data and metadata uploaded to the server. In an embodiment, the auto review or re-verify may be initiated automatically upon completion of each trip of the driver. The auto review can also be initiated on demand, or on an ongoing basis without waiting for the trip to end. The event data may be modified based on results of the auto review, as per requirement.

Figure 6:
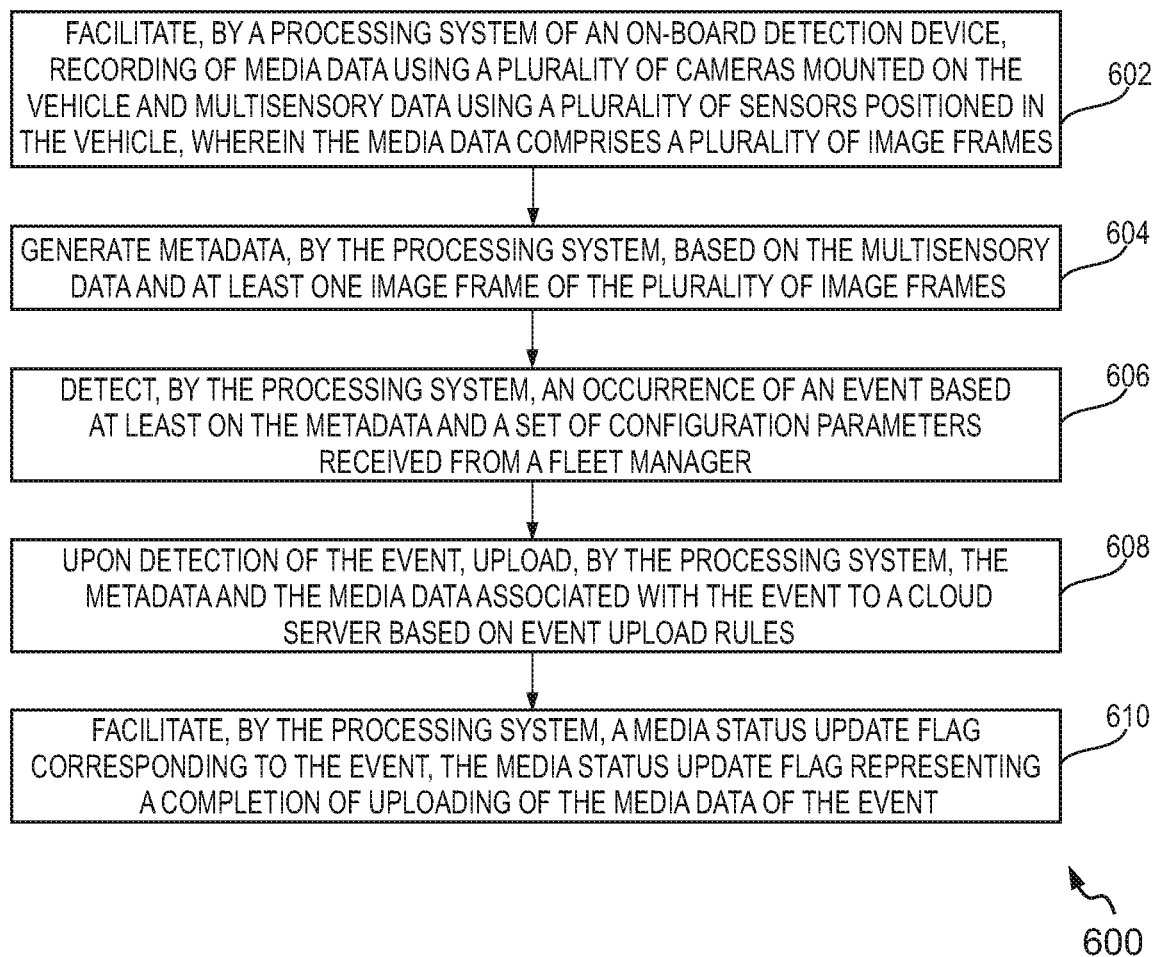
FIG. 6 is a flow chart of a method for driver behavior monitoring during a trip, in accordance with an exemplary embodiment of the present disclosure.

Referring now to FIG. 6, a flow chart of a method 600 for driver behavior monitoring in a vehicle during a trip is shown, in accordance with an example embodiment of the present disclosure. The method 600 is explained by taking an example of the vehicle 102, however, the method 600 can be applied to other types of vehicles as well.

The method 600 is described with reference to an on-board detection device 110 (referring to FIG. 1) positioned in the vehicle 102. The on-board detection device 110 includes, but not limited to, a processing system and an interface for communicating the sensors 109 and the cameras 111 positioned at different locations within the vehicle 102. The method is performed by the processing system of the on-board detection device.

Operation 602 of the method 600 includes facilitating recording of media data and multisensory data. The media data includes audio and image data of one or more views, captured by the plurality of cameras 111, related to the trip of the driver 108 in the vehicle 102. The multisensory data includes sensor data recorded from the plurality of sensors 109 positioned in the vehicle 102. The media data includes a plurality of image frames.

Operation 604 includes generating metadata related to the trip in real time. The metadata includes the multisensory data and at least one image frame from the plurality of image frames of the media data. The metadata may include information about events that might have occurred when the driver 108 is operating the vehicle 102. The events that can occur while operating the vehicle 102 may include speeding violation, a stopping violation, a traffic signal violation, lane drifting, tail gating, harsh braking, harsh acceleration and the like.

Operation 606 includes detecting an occurrence of an event based at least on the metadata and a set of configuration parameters received from a fleet manager. The metadata may locally be analyzed by the processing system of the on-board detection device 110. The processing system analyzes the metadata based on the set of configuration parameters and detects whether an event has occurred or not.

Operation 608 of the method 600 includes uploading the metadata and the media data associated with the event to a cloud server based on event upload rules. The event upload rules are defined by a fleet or the fleet manager 114. The event upload rules are stored locally in the on-board detection device at a start of the trip. The event upload rules include, but are not limited to, priority values corresponding to a plurality of events, a severity level corresponding to each event, a maximum number of events to be uploaded per distance, a maximum number of events to be uploaded per hour.

Operation 610 of the method 600 includes facilitating a media status update flag corresponding to the event. The media status update flag represents a completion of uploading of the media data associated with the event to the cloud server. This media status flag is a visual representation of a successful completion of upload of the media data associated with the event. The metadata associated with the event is uploaded in almost real time due to its low bandwidth consumption and small file size, but the media data consisting of image and audio data related to the event will take a bit longer to be uploaded. The media status update flag is set by the processing system for notifying the fleet manager 114 and the cloud server 118 about the successful reception of media data associated with the event.

In an embodiment, the method 600 further includes displaying the metadata, a link associated with the media data associated with the event, and a challenge button corresponding to the event on a display in form of dashboard and sending a notification to the fleet manager when the driver selects the challenge button corresponding to the event.

Figure 7:
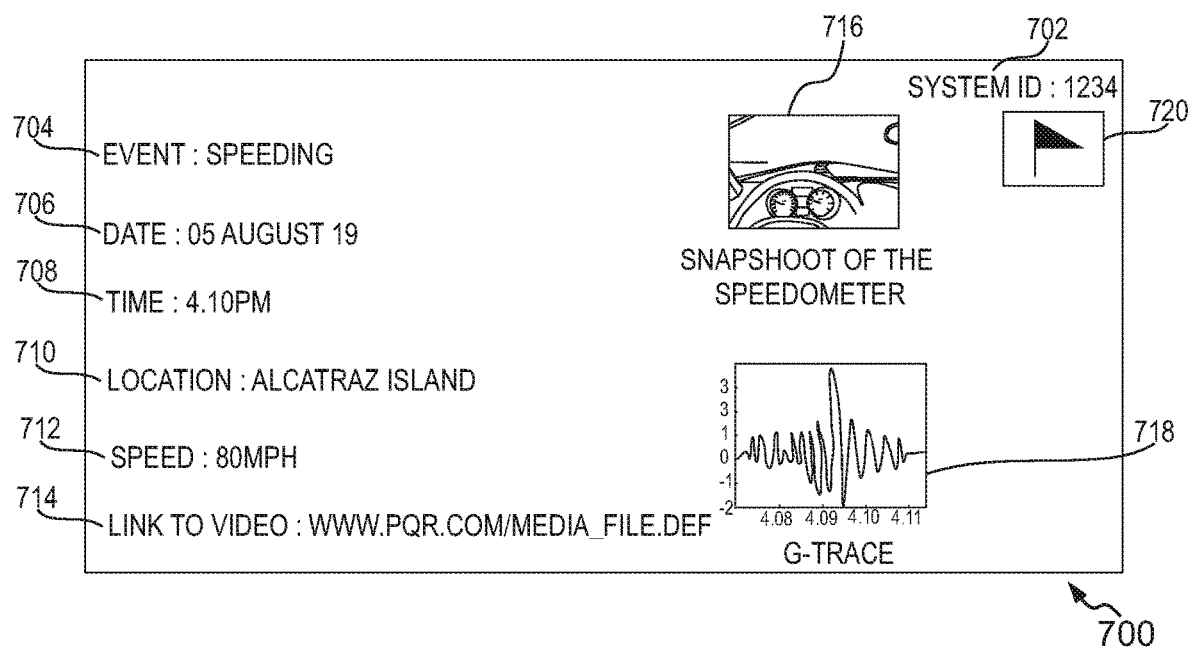
FIG. 7 illustrates an example of a UI of a dashboard of a detected event from a list of events, in accordance with an exemplary embodiment of the present disclosure.

Now referring to FIG. 7, a schematic representation of a detailed data dashboard 700 displaying the details of an event selected from the list of events shown in the data dashboard 700. The data dashboard is displayed on the dashboard display of the on-board detection device 110. It is exemplarily shown that the speeding event from the data dashboard 700 is chosen and the details of that event is shown in the detailed data dashboard 700. The data dashboard 700 is exemplarily shown to display the system ID (unique serial number) 702 of the system with which the event is associated with. The system ID 702 is exemplarily shown in the top right corner of the detailed data dashboard 700. Further, the detailed data dashboard 700 has a plurality of details about the event such as the event type 704, date 706, time 708, location 710, speed 712, link to the video 714, snapshot of the event 716, G-sensor trace 718 and a field 720.

The event type 704 refers to what event has occurred. In the embodiment it is exemplarily shown that the event is 'speeding'. The date 706 depicts the date on which the event occurred. It is exemplarily shown that the event has occurred on 5 Aug. 2018. The time 708 depicts the time at which the event occurred. It is exemplarily shown that the event occurred at 4:10 PM. The location 710 depicts the approximate location where the event occurred. It is exemplarily shown that the event occurred at the location 'Al Catraz Island'. The speed 712 depicts the maximum speed that the vehicle has reached during the event. It is to be noted that this is the maximum speed that the vehicle has reached. The link to the video 714 is shown to the fleet manager 114. It is a selectable link and will lead to the video player if selected. The snapshot of the event 716 is an image frame from the video of the event. The processing system is configured to select the most important picture such as where the speed was maximum or the like to be displayed as the snapshot. Further, the G-sensor trace 718 depicts the acceleration and deceleration graph traced during the event. The G-sensor traces have acceleration as their y-axis attribute and time range as their x-axis attribute. Further, the field 720 represents a media status update flag which is sent by the on-board detection device 110 to the cloud server 118 as a visual representation for the successful uploading of the media data related to the event.

Figure 8:
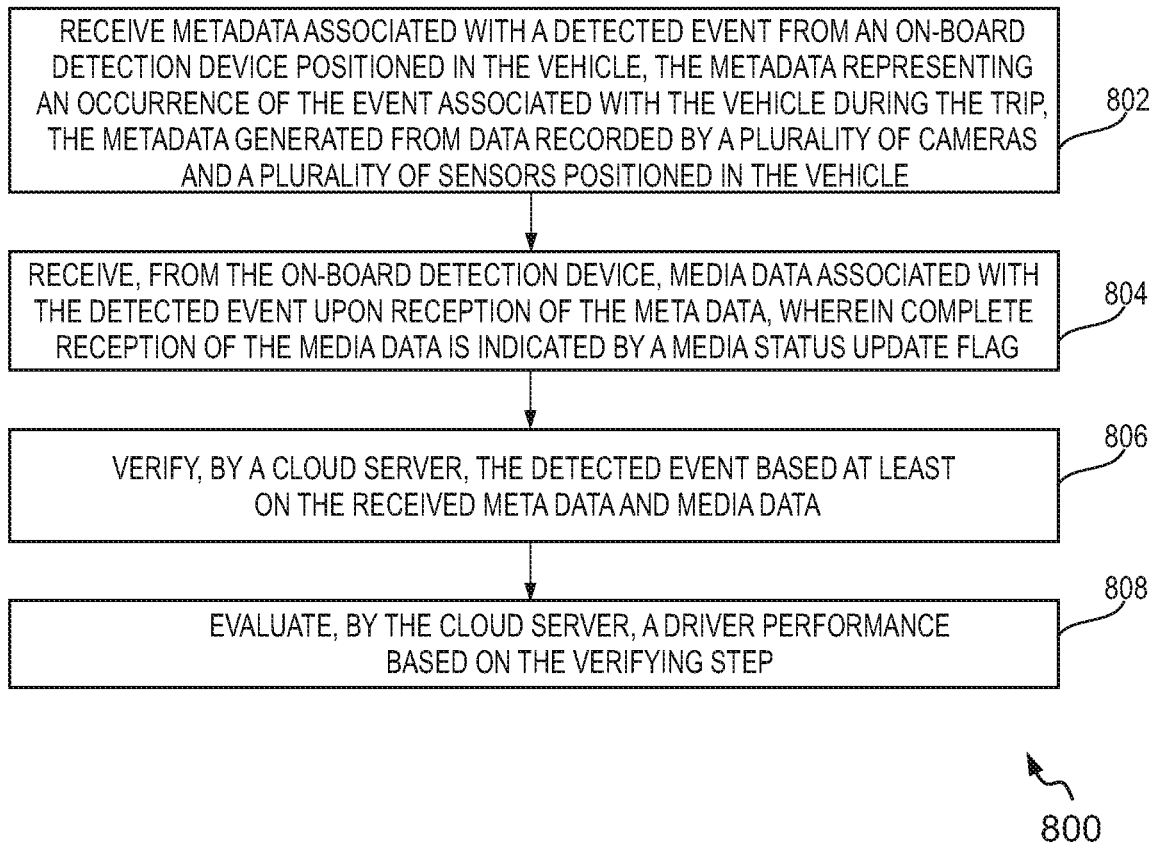
FIG. 8 is a flow chart of a method performed by a cloud server for evaluating a driver performance associated with a vehicle during a trip, in accordance with an exemplary embodiment of the present disclosure.

Now referring to FIG. 8, a flow chart of a method 800 of evaluating a driver performance associated with a vehicle during a trip, in accordance with an example embodiment of the present disclosure. The method 800 is performed by the cloud server 118.

Operation 802 includes receiving metadata related to a detected event, from the on-board detection device 110. The metadata represents an occurrence of the event associated with the vehicle during the trip. The metadata are generated by the on-board detection device from data recorded by the cameras 111 and the sensors 109 positioned in the vehicle.

Operation 804 of the method 800 includes receiving, from the on-board detection device, media data associated with the detected event upon reception of the metadata. The metadata received at step 802 is received almost at the real time as soon as the events are detected. The cloud server 118 is configured to receive a media status update flag that indicates a complete reception of the media data related to the detected event. As the media data takes a bit longer to get uploaded to the cloud server 118, therefore to notify the fleet manager 114 about the completion of uploading of media data, a media status update flag is rendered. The media status update flag is a visual representation of successful reception of media data to the cloud server 118. It is then possible by the fleet manager to view the details of the detected event along with the video associated with it.

Operation 806 of the method 800 includes verifying the detected event based on the received metadata and media data using more complex detection and sophisticated algorithms, which result in more precise and accurate detection. This feature of evaluating all the detected events again by the cloud server 118 is called 'Auto Review'. In an example embodiment, the "Auto Review" is performed after the end of each trip. In some embodiments, the "Auto Review" may be done on-demand in the middle of the trip if a driver wants an event to be evaluated again. In some embodiments, the method 800 further includes updating event data based on the verifying step. The event data represents information of all detected events corresponding to the vehicle during the trip.

Operation 808 of the method 800 includes evaluating the driver performance based on the verifying step. The driver performance is evaluated by calculating a performance score associated with the driver during the trip based at least one of a number of events detected during the trip, a predetermined weight coefficient for each detected event during the trip, and a distance covered in the trip.

Figure 9:
FIG. 9 illustrates an example representation of a UI of a dashboard related to a list of abnormal trips flagged for review, in accordance with an exemplary embodiment of the present disclosure.

FIG. 9 represents an example of a list of abnormal trips displayed to the fleet manager 114. The list of abnormal trips reduces a manual work of the fleet manager 114 in finding abnormal trips. The vehicle 102 is installed with the cameras 111 and the sensors 109 and both are connected to the on-board detection device 110, however there are some scenarios when something (for example, cameras, sensors, or on-board detection device) may not function as intended. The scenarios may be one of:
 a) The cameras 111 and/or sensors 109 are not connected to the on-board detection device 110 properly.
 b) The cameras 111 and/or the sensors 109 are never turned on.
 c) The cameras 111 and/or the sensors 109 are not mounted improperly in the vehicle 102. For example, the cameras 111 are not mounted with too much of a pitch, roll, or a yaw angle. In these cases, performance of the driver behavioral monitoring system for event detection may be suboptimal.

These anomalies may be detected by the on-board detection device 110 and flagged for review. These anomalous trips may be shown in a separate list (as shown in FIG. 9) to the fleet manager 114 who is responsible for reviewing the trips.

In scenarios a) and b), the anomalies are associated with the connectivity and working of the cameras 111 and the sensors 109. The on-board detection device 110 is configured to detect the anomalies by analyzing a diagnostic information. The diagnostic information represents the anomaly. For example, if all the sensory data are received and the event has been detected but the media related to that event is not available. The diagnostic information shows that the cameras 111 were not powered on. In another example, the diagnostic information may show that the on-board detection device 110 is not paired and is far away from the cameras 111 and the sensors 109. Such diagnostic information is used to detect anomalous trips. Hence, as explained above, the diagnostic information may include information parameters related to working status of the plurality of cameras and the plurality of sensors and connectivity status of the plurality of cameras and the plurality of sensors with the on-board detection device.

In the scenario c), the on-board detection device 110 is connected with the cameras 111, but not mounted properly. To detect this anomaly, the on-board detection device 110 is configured to detect mounting of each of the cameras 111, whether it is correct or not, in the vehicle 102. The on-board detection device 110 is configured to facilitate recording of a short video snippet or a still image at the start of the trip and upload the short video snippet to the cloud server 118 for manually review whether the particular camera is properly mounted or not in the vehicle 102. However, this is not a scalable solution, especially, when the number of vehicles runs into hundreds and thousands and more. To address this challenge, one embodiment of the present disclosure describes an algorithm to detect if a camera is mounted correctly or not based on either a still image or a short video snippet.

According to the embodiment, the processing system of the on-board detection device 110 is configured to train a neural network or a discriminative classifier such as, but not limited to Convolutional Neural Network (CNN), using various sample data (for example, a short video snippet, a still image, etc.) of properly mounted camera and improperly mounted camera. At the beginning of the trip, the processing system facilitates recording of a still image or a short video snippet by a specific camera and will decide mounting of the specific camera whether it is correctly mounted or not, using the discriminative classifier.

In an alternative embodiment, a generative model may be used to train a neural network model using only properly mounted sample data. In this case, for inference, test data is scored against the generative model and the score indicates the probability that the test data was generated from a distribution that the generative model describes. In one embodiment, similar above methods may also be applied for determining mounting of the sensors of the vehicle.

In another embodiment, the cloud server 118 may also configured to train a neural network using a discriminative method or a generative method for detecting a camera mounting in the vehicle 102.

Referring back to FIG. 9, the schematic representation 900 contains a heading 'list of abnormal trips' 902. There are various columns in the representation to list out details about the plurality of abnormal trips. The first column is the system ID (unique serial number) 904. All the system IDs of the on-board detection devices are listed under this column. The next column is the 'trip date' 906. The date of occurrence of the detected abnormal trips corresponding to various systems are displayed under this column. The next column is the 'type of vehicle' 908. The type of vehicle with which the detected abnormal trips are associated with are listed down in this column. The types of vehicle may be one of but not limited to LCV, MCV or HCV. The nest column is 'Remarks' 910. This column is used to display a brief remark about the detection of abnormal trip associated with a system. It is exemplarily shown in one of the rows that the System ID (unique serial number) 904 is '12345', the trip date 906 is '5 Aug. 2018', the type of vehicle 908 is 'LCV' and the remarks 910 is 'cameras off'.

In some embodiments, camera calibration may be changed due to several reasons. For example, it is possible for the camera to sometimes move, either due to aging of the adhesive, inadvertently touching the camera, etc. In one exemplary embodiment, the camera calibration can be done using specialized charts or it can be done using "on the fly" methods. Calibration parameters of the cameras are valid as long as the cameras do not move. Though to the naked eye, the cameras and the video footage may sometimes look okay, even the slightest displacements can adversely affect the camera calibration, which in turn affects the functionality of the on-board detection device. Hence, the embodiments of the present disclosure provide methods and systems for automatically calibrating the camera.

Figure 10:
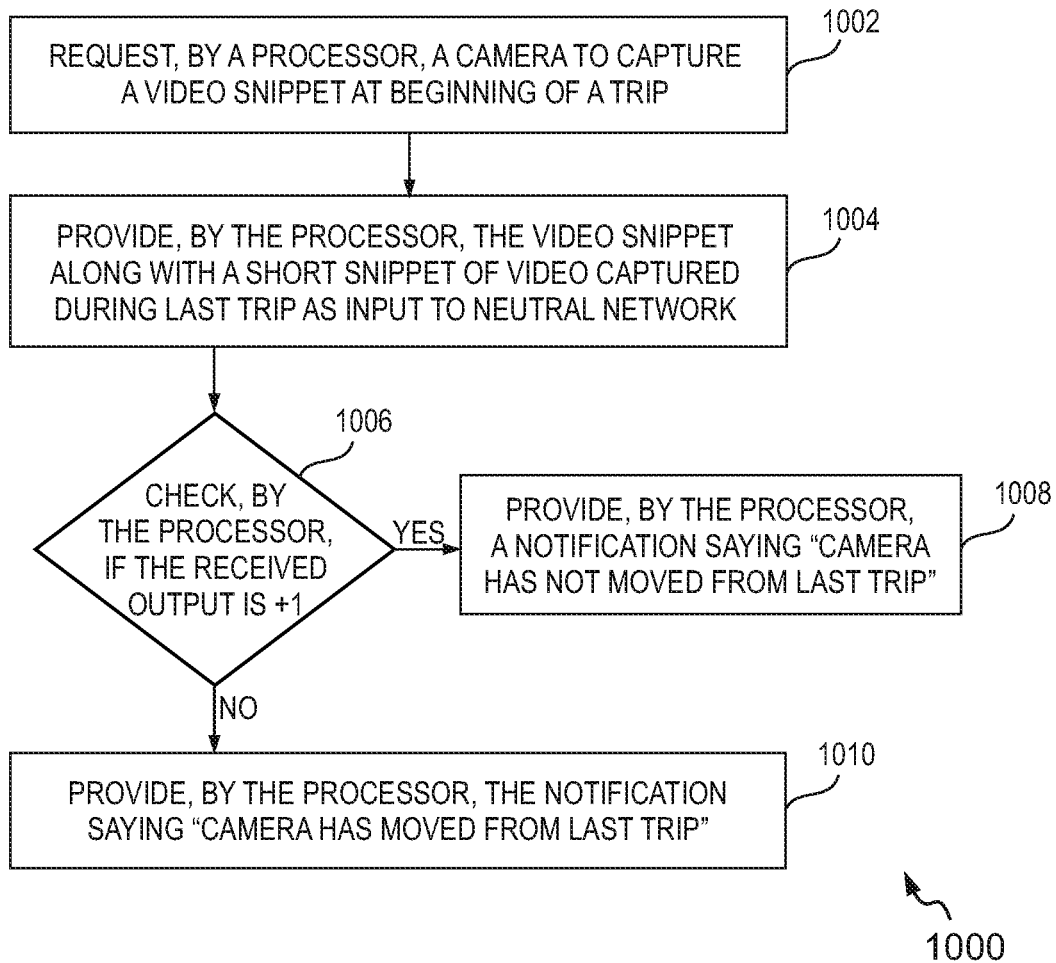
FIG. 10 is a flow chart of a method of evaluating calibration of cameras associated with a vehicle before beginning a trip, in accordance with an exemplary embodiment of the present disclosure.

Now referring to FIG. 10, a flow chart of a method 1000 of evaluating calibration of cameras associated with a vehicle before beginning a trip, in accordance with an example embodiment of the present disclosure.

In an embodiment, the processing system may be adapted to request the camera to capture a video snippet at beginning of the trip (e.g. step 1002 in FIG. 10) to check the alignment of the camera in the vehicle 102. In another embodiment, the processing system may also request the camera to capture the video snippet during at least one of the beginning of the trip and the end of the trip. The processing system analyses the video snippet, via a neural network (e.g. step 1004 in FIG. 10). The neural network may be trained to provide an output as '+1' if the current video snippet is same as a previous video snippet and may be trained to provide an output as '−1' if the current video snippet is dissimilar as the previous video snippet. In an embodiment, the neural network provides output by considering the angular inclination of the current and the previous video snippet, i.e. mounting of the camera. Subsequently, the processing system confirms the output from the neural network (e.g. step 1006 in FIG. 10). The processing system upon receiving output as '+1' from the neural network, the processing system determines that the position of the camera is unaltered or un-tampered and transmits the notification accordingly (e.g. step 1008 in FIG. 10). The processing system upon receiving output as '−1' from the neural network, the processing system determines that the position of the camera is altered or moved, and transmits the notification accordingly requesting camera calibration (e.g. step 1010 in FIG. 10). In yet another embodiment, the output of the neural network can be a continuous valued number between −1 and +1, indicating the 'correctness of the mounting, including occlusions, pitch, roll, yaw, etc. The continuous valued number may be helpful in two scenarios, firstly to confirm whether the camera is installed correctly (i.e. after first installation/re-installation or during the beginning of a trip) and secondly, to check periodically whether the camera has accidentally moved or not. For detecting the accidental movement of the camera, a combination of video/image data and inertial measurement unit (IMU) data may be used. If the camera mounting is seen to be incorrect or below a threshold value (+1 to −1 range), or if the camera is judged to have moved either advertently or inadvertently, a notification may be generated and sent to both a driver (audible feedback) and the fleet manager for informing them about the camera calibration so that corrective action can be initiated.

Figure 11:
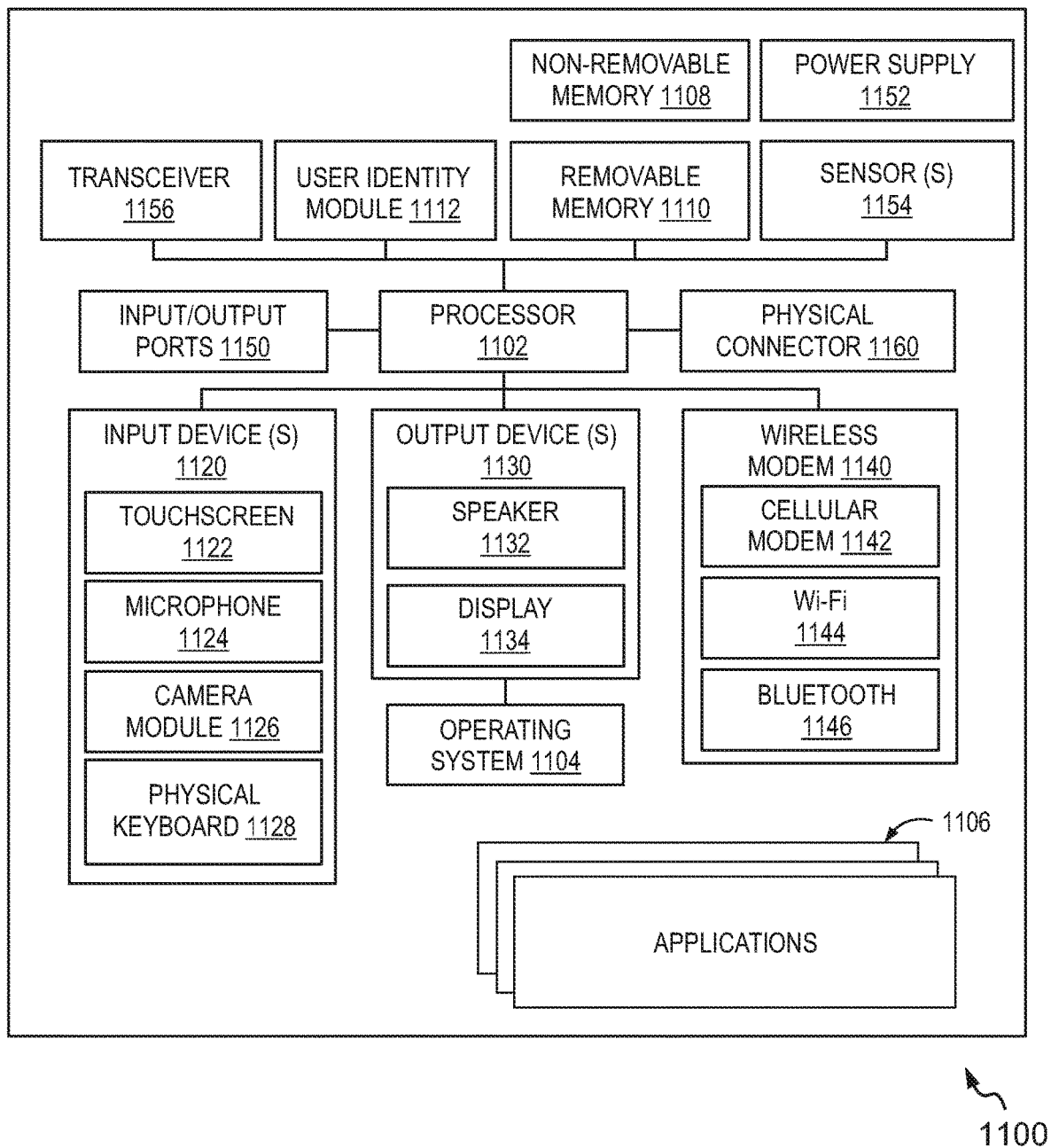
FIG. 11 is a block diagram of an on-board detection device positioned within a vehicle for driver monitoring during a trip, in accordance with an example embodiment of the present disclosure.

FIG. 11 shows a simplified block diagram of a remote device for example a mobile phone 1100 capable of implementing the various embodiments of the present disclosure. The remote device 1100 may be an example of on-board detection device 1110. In an embodiment, the various operations related to facilitate recording using the cameras and the sensors, generating metadata, detecting an event based on the metadata and the set of configuration parameters, and uploading the metadata and the media data associated with the detected event can be facilitated using a remote device 1100. The data related to events can be provided as an online service, or as an application (standalone application) installed in the mobile phone 1100.

It should be understood that the mobile phone 1100 as illustrated and hereinafter described is merely illustrative of one type of device and should not be taken to limit the scope of the embodiments. As such, it should be appreciated that at least some of the components described below in connection with that the mobile phone 1100 may be optional and thus in an example embodiment may include more, less or different components than those described in connection with the example embodiment of the FIG. 11. As such, among other examples, the mobile phone 1100 could be any of a mobile electronic devices or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated mobile phone 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the mobile phone 1100 and support for one or more applications programs (see, file retrieval application 1110). The file retrieval application 1110 may include common mobile computing applications (e.g., web browsers, messaging applications) or any other computing application.

The illustrated mobile phone 1100 includes one or more memory components, for example, a non-removable memory 1108 and/or removable memory 1110. The non-removable memory 1108 and/or removable memory 1110 may be collectively known as database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the file retrieval application 1110. The mobile phone 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile phone 1100 supports one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include but are not limited to a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the mobile phone 1100 and a public switched telephone network (PSTN).

The mobile phone 1100 can further include one or more input/output ports 1150, a power supply 1152, one or more sensors 1154 for example, an accelerometer, a gyroscope, a compass, object detecting sensors, or an infrared proximity sensor for detecting the orientation or motion of the mobile phone 1100, a transceiver 1156 (for wirelessly transmitting analog or digital signals) and/or a physical connector 1160, which can be a USB port, IEEE 10394 (FireWire) port, and/or RS-232 port. The transceiver is configured to effect communication with a cloud server and a fleet manager device via one or more networks. The illustrated components are not required or all-inclusive, as any of the components shown can be deleted and other components can be added.

Figure 12:
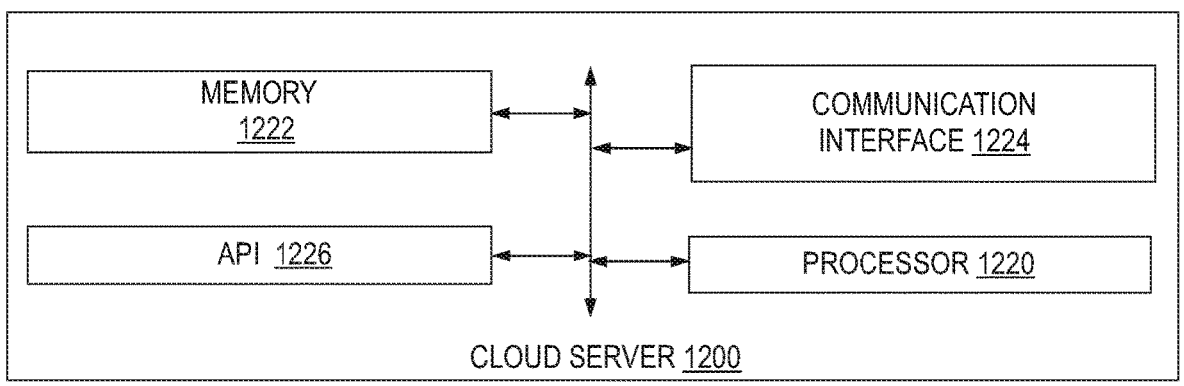
FIG. 12 is a block diagram of a cloud server for evaluating a driver behavior associated with a vehicle during a trip, in accordance with an exemplary embodiment of the present disclosure.

FIG. 12 is a simplified block diagram of a cloud server 1200, for evaluating a driver performance associated with a vehicle during a trip, in accordance with one embodiment of the present disclosure. The cloud server 1200 is an example of the cloud server 118 shown and explained with reference to FIG. 1. The cloud server 1200 includes a processor 1220, a memory 1222, a communication interface 1224, and an API 1226.

The cloud server 1200 includes a processor 1220 for executing instructions. Instructions may be stored in, for example, but not limited to, a memory 1222. The processor 1220 may include one or more processing units (e.g., in a multi-core configuration). The processor 1220 is operatively coupled to a communication interface 1224 such that the cloud server 1200 is capable of communicating with a remote device.

The memory 1222 is a storage device embodied as one or more volatile memory devices, one or more non-volatile memory devices, and/or a combination of one or more volatile memory devices and non-volatile memory devices, for storing microcontents information and instructions. The memory 1208 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The processor 1220 is configured to receive metadata related to a detected event, from the remote device (referring to FIG. 11). The metadata represents an occurrence of the event associated with the vehicle during the trip. The metadata are generated by the remote device from data recorded by the cameras 111 and the sensors 109 positioned in the vehicle. The processor 1220 is configured to receive media data associated with the detected event upon reception of the metadata. The cloud server 1200 is configured to receive a media status update flag that indicates a complete reception of the media data related to the detected event. The media status update flag is a visual representation of successful reception of media data to the cloud server 1200. The processor 1220 is configured to facilitate display of event data associated with the media status update flag to the fleet manager 114 and the remote device 1100 using the API 1226. The processor 1220 is configured to verify the detected event based on the received metadata and media data using more complex detection and sophisticated algorithms. Based on the verify, the processor 1220 is configured to update event data corresponding to the vehicle during the trip, which helps in calculating a fair performance score associated with the driver during the trip. The processor 1220 is configured to evaluate the driver performance by calculating a performance score associated with the driver in the vehicle during the trip based at least on a number of detected events.

Without in any way limiting the scope, interpretation, or application of the claims appearing below, a technical effect of one or more of the example embodiments disclosed herein is to provide effective, actionable, and timely analytics for the driver and the fleet manager ensuring safe vehicle operations, provide an improved user experience, and facilitate an efficient data upload framework at the vehicle side to minimize cellular data usage.

The disclosed methods with reference to FIGS. 1 to 12, or one or more operations of the flow diagrams 600, 800, and 1000 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry)

Particularly, the on-board detection device and/or fleet manager device and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein.

In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the invention.

We claim:

1. A method of evaluating driver behavior associated with a vehicle during a trip, the method being performed by a cloud server, the method comprising:
   receiving metadata associated with a detected event, from an on-board detection device positioned in the vehicle, the metadata representing an occurrence of the event associated with the vehicle during the trip, the metadata generated from data recorded by a plurality of cameras and a plurality of sensors positioned in the vehicle;
   receiving, from the on-board detection device, media data associated with the detected event upon reception of the metadata, wherein complete reception of the media data is indicated by a media status update flag;
   verifying the detected event based at least on the received metadata and media data; and
   evaluating a driver performance based at least on the verifying step,
   wherein upon selection of a challenge input for the detected event by a driver, performing:
   receiving a re-verify request from the on-board detection device of the driver,
   providing the metadata and the media data associated with the detected event to a fleet manager for re-verify;
   receiving a notification from the fleet manager for updating a performance score associated with the driver, and
   updating the performance score associated with the driver based on the notification.

2. The method as claimed in claim 1, further comprising updating event data associated with the vehicle during the trip based on the verifying step, wherein the event data comprises information of a number of events detected during the trip.

3. The method as claimed in claim 1, wherein verifying the detected event is further based on a set of configuration parameters received from a fleet manager, and wherein the set of configuration parameters is based on a type of vehicle and comprises threshold parameters for detecting occurrences of a plurality of events during the trip for each type of vehicle.

4. The method as claimed in claim 3, wherein the plurality of events comprises: speeding violation, stop violation, tail gating, lane drifting, hard braking, distracted driving and/or drowsy driving.

5. The method as claimed in claim 1, wherein evaluating the driver performance comprises calculating the performance score associated with the driver during the trip based on at least one of:
   a number of events detected during the trip,
   a distance covered in the trip, and
   a predetermined weight coefficient for each detected event during the trip.

6. A system for evaluating driver behavior associated with a vehicle during a trip, the system comprising:
   an interface configured to communicate with an on-board detection device positioned in the vehicle and a fleet manager device via one or more networks;
   a memory configured to store instructions; and
   a processor configured to execute the instructions stored in the memory and thereby cause the system to perform at least in part to:
   receive metadata associated with a detected event, from the on-board detection device, the metadata representing an occurrence of the event associated with the vehicle during the trip, the metadata generated from data recorded by a plurality of cameras and a plurality of sensors positioned in the vehicle,
   receive, from the on-board detection device, media data associated with the detected event upon reception of the metadata, wherein complete reception of the media data is indicated by a media status update flag, and wherein the media data is accessible at a fleet manager when the media status update flag is set,
   verify the detected event based at least on the received metadata and media data, update event data, the event data comprising information of a number of events detected during the trip, based on the verification of the detected event, and evaluate a driver performance based on the updated event data,
   wherein upon selection of a challenge input for the detected event by a driver, performing: receiving a re-verify request from the on-board detection device of the driver, providing the metadata and the media data associated with the detected event to a fleet manager for re-verify; receiving a notification from the fleet manager for updating a performance score associated with the driver, and updating the performance score associated with the driver based on the notification.

7. The system as claimed in claim 6, wherein the processor is further configured to cause the system to perform at least in part to calculate a performance score associated with the driver during the trip based at least one of:
   the number of events detected during the trip,
   a distance covered in the trip, and
   a predetermined weight coefficient for each detected event during the trip.

* * * * *